(12) United States Patent
Galmiche et al.

(10) Patent No.: US 7,322,598 B2
(45) Date of Patent: Jan. 29, 2008

(54) SET OF EQUIPMENT COMPRISING AN INFLATABLE STRUCTURE AND MEANS FOR GUIDING ITS DEPLOYMENT, AND CORRESPONDING MOTOR VEHICLE

(75) Inventors: Etienne Galmiche, Etupes (FR); Eric Laspesa, Six Fours (FR); Laurent D'Emmanuelle, Toulon (FR)

(73) Assignees: Faurecia Industries, Nanterre (FR); SNPE Materiaux Energetiques, Paris (FR)

( * ) Notice: Subject to any disclaimer, the term of this patent is extended or adjusted under 35 U.S.C. 154(b) by 334 days.

(21) Appl. No.: 10/724,754

(22) Filed: Dec. 2, 2003

(65) Prior Publication Data

US 2004/0145163 A1 Jul. 29, 2004

(30) Foreign Application Priority Data

Dec. 5, 2002 (FR) .................................. 02 15382

(51) Int. Cl.
  *B60R 21/045* (2006.01)
(52) U.S. Cl. ................................... 280/730.1; 280/752
(58) Field of Classification Search ............ 280/728.1, 280/748, 751–2, 752, 751; 296/1.04, 187.05, 296/187.06, 70
  See application file for complete search history.

(56) References Cited

U.S. PATENT DOCUMENTS

| 4,772,045 A | * | 9/1988 | Kawaguchi et al. ........ 280/731 |
| 5,447,326 A | | 9/1995 | Daniel et al. |
| 5,536,043 A | * | 7/1996 | Lang et al. .................. 280/753 |
| 6,019,390 A | * | 2/2000 | Keshavaraj ............. 280/743.1 |
| 6,050,600 A | * | 4/2000 | Yoshida ....................... 280/740 |
| 6,056,313 A | * | 5/2000 | Lutz et al. ............... 280/728.1 |
| 6,131,950 A | | 10/2000 | Schroeter |
| 6,305,710 B1 | * | 10/2001 | Bosgieter et al. ............ 280/753 |
| 6,331,015 B1 | * | 12/2001 | Doxey et al. ............. 280/743.1 |
| 6,378,902 B2 | * | 4/2002 | Unger et al. ................. 280/753 |
| 6,416,079 B1 | * | 7/2002 | Lutz et al. ............... 280/730.1 |
| 6,688,643 B2 | * | 2/2004 | Schneider ................... 280/753 |
| 6,817,627 B2 | * | 11/2004 | Galmiche et al. ........ 280/730.1 |
| 6,874,811 B2 | * | 4/2005 | Enders et al. ............ 280/730.1 |
| 7,048,304 B1 | * | 5/2006 | Keshavaraj ............. 280/743.1 |
| 2001/0000015 A1 | * | 3/2001 | Igawa et al. ................ 280/740 |

(Continued)

FOREIGN PATENT DOCUMENTS

EP 0 684 164 11/1995

OTHER PUBLICATIONS

Patent Abstracts of Japan, vol. 017, No. 083 (M-1369) 18 fevrier 1993 (Feb. 18, 1993) & JP 04 283147 A (Toyota Motor Corp), Oct. 8, 1992 *abrege.

Primary Examiner—Paul N. Dickson
Assistant Examiner—Leonard McCreary, Jr.
(74) Attorney, Agent, or Firm—Young & Thompson (57) ABSTRACT

Set of equipment (1) for a motor vehicle includes an inflatable structure (2), a support (4) for the inflatable structure, elements for (6) inflating the structure in a direction of inflation (D) in order to deploy it, a plate (8) for spreading the load when an occupant of the vehicle impacts on the deployed inflatable structure, and elements for guiding the structure as it deploys so that, in the deployed configuration, the structure extends along a median directrix line (L) distinct from its direction of inflation (D). The guide elements include the side wall (12) of the structure which, in the deployed configuration, is substantially taut.

6 Claims, 5 Drawing Sheets

U.S. PATENT DOCUMENTS

2001/0028165 A1* 10/2001 Nishijima et al. ....... 280/743.1
2002/0195800 A1* 12/2002 Florsheimer ............. 280/728.3
2005/0062264 A1* 3/2005 Arwood et al. .......... 280/730.1
2005/0253369 A1* 11/2005 Taoka ........................ 280/752

* cited by examiner

SET OF EQUIPMENT COMPRISING AN INFLATABLE STRUCTURE AND MEANS FOR GUIDING ITS DEPLOYMENT, AND CORRESPONDING MOTOR VEHICLE

BACKGROUND OF THE INVENTION

The present invention relates to a set of equipment for a motor vehicle, of the type comprising:

- an inflatable structure comprising a side wall and an end wall, the inflatable structure having a folded configuration and a deployed configuration,
- a support for the inflatable structure,
- means of inflating the structure in a direction of inflation in order to deploy it,
- a plate for spreading the load when an occupant of the vehicle impacts on the deployed inflatable structure,
- means of guiding the structure as it deploys so that, in the deployed configuration, the structure extends along a median directrix line distinct from its direction of inflation.

The invention applies in particular to sets of equipment comprising inflatable structures for protecting the knees of the occupants of motor vehicles.

DESCRIPTION OF THE RELATED ART

Sets of the aforementioned type are known in such an application. The guide means generally consist of straps which extend inside the inflatable structure and connect the support to the load-spreading plate.

These straps make it possible, at the end of deployment of the structure, to bring about an upwards pivoting movement of the load-spreading plate.

These guide means allow the load-spreading plate to be positioned satisfactorily facing the knees of an occupant of a motor vehicle.

However, the nature of these guide means, which in particular entails fixing the straps to the support and to the load-spreading plate, leads to a set of equipment of relatively high cost.

SUMMARY OF THE INVENTION

One object of the invention is to solve this problem by providing a set of equipment of the abovementioned type which costs less.

To this end, the subject of the invention is a set of equipment of the aforementioned type, wherein the guide means comprise the side wall of the structure which, in the deployed configuration, is substantially taut.

According to some particular embodiments, the set of equipment may have one or more of the following features taken in isolation or in any technical feasible combination:

- the side wall of the structure has a first diagonal shorter than a second diagonal of the side wall so that, as the structure deploys, the side wall which is substantially taut along the first diagonal brings the structure towards the median directrix line,
- the set comprises a sheath forming the side wall of the inflatable structure and comprising an open first end fixed to the support and an open second end fixed to the load-spreading plate, the load-spreading plate closing off the open second end to form the end wall of the inflatable structure,
- when the structure is in the deployed configuration, the side wall extends substantially over its entire periphery along generatrices parallel to the median directrix line,
- the median directrix line is intended to be inclined upwards with respect to the direction of inflation when the set of equipment is installed in a motor vehicle,
- the set constitutes an element for protecting the knees of an occupant of the motor vehicle.

Another subject of the invention is a motor vehicle characterized in that it comprises a set of equipment as defined hereinabove.

BRIEF DESCRIPTION OF THE DRAWINGS

The invention will be better understood from reading the description which will follow, given solely by way of example made with reference to FIGS. 1 to 6:

FIG. 1 being a schematic longitudinal section of a set of equipment according to a first embodiment of the invention, FIG. 2 being a schematic perspective view of the thin web for fixing the load-spreading plate to the support of the set of FIG. 1, FIGS. 3 and 4 being views similar to FIG. 1, on a smaller scale, illustrating the deployment of the inflatable structure of the set of FIG. 1, FIG. 5 being a schematic perspective view illustrating another embodiment of the sheath of the inflatable structure of the set of FIG. 1, and FIG. 6 being a schematic view from above illustrating the sheath of FIG. 5, developed.

DESCRIPTION OF THE PREFERRED EMBODIMENTS

In all of that which follows, the orientations used are the customary orientations of a motor vehicle. Thus the terms "front", "rear", "top" and "bottom" are to be understood with respect to the position of a driver of the motor vehicle and its direction of travel.

Figure 1:
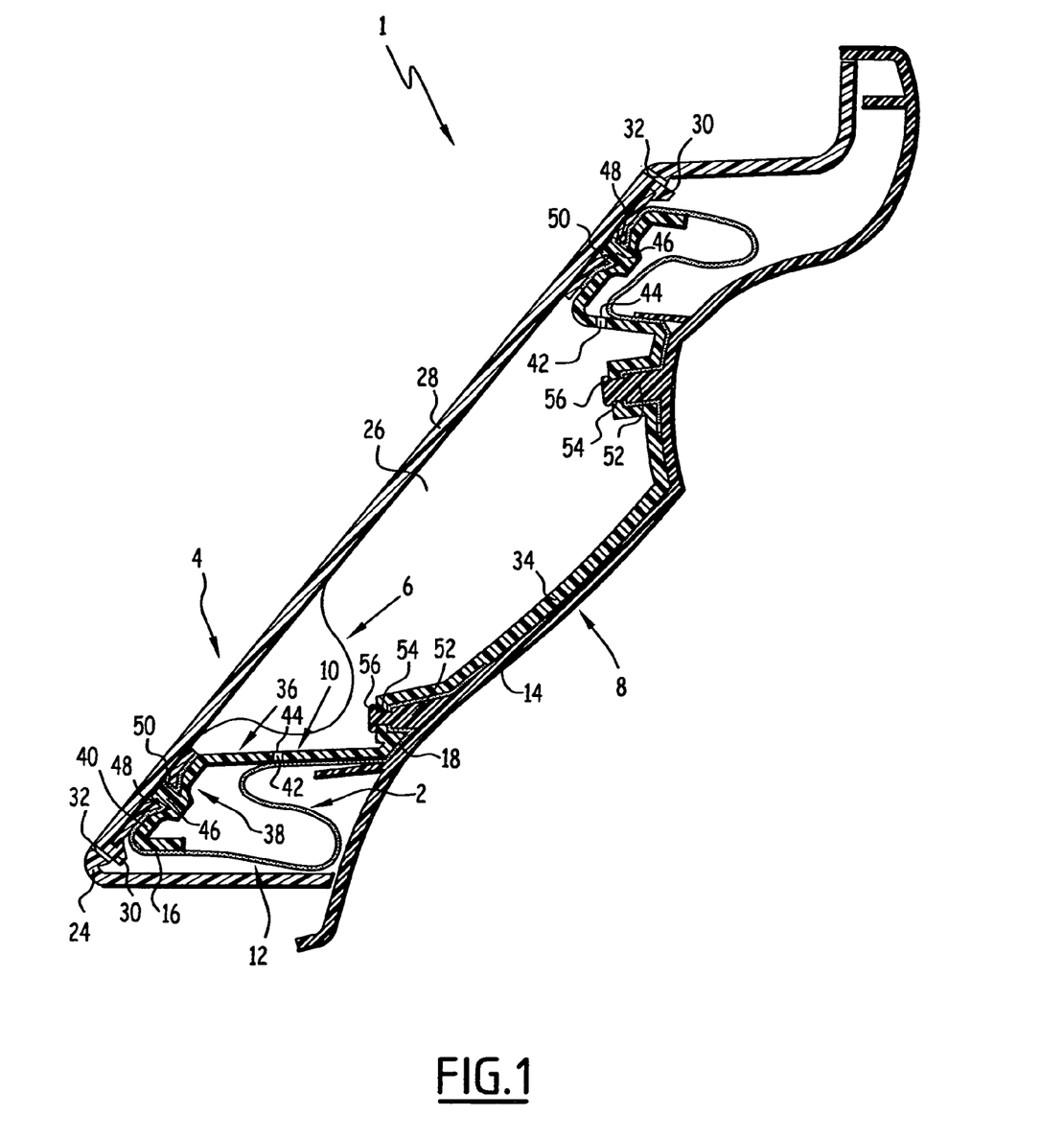

FIG. 1 schematically illustrates a set of equipment 1 for a motor vehicle, in the form of a door to a storage binnacle for housing items. This storage binnacle is provided in the instrument panel. The door 1 therefore forms part of the instrument panel. It is arranged more or less facing the knees of a passenger of the motor vehicle.

The door 1 is conventionally hinged to the remainder of the instrument panel to allow access to the storage binnacle.

The elements of the instrument panel other than the door 1 are conventional. They have therefore not been depicted in the figures and will not be described in detail hereinafter.

The door 1 essentially comprises:

an inflatable structure 2,
a front support 4 for the inflatable structure 2,
means 6 for inflating the structure 2,
a load-spreading back plate 8 for spreading the load when the passenger impacts with the structure 2, and
a frangible thin web 10 for fixing the load-spreading plate 8 to the support 4.

The inflatable structure 2 comprises, on the one hand, a sheath 12 which forms its side wall and comprises, on the other hand, the central zone 14 of the load-spreading plate 8 which forms its end wall, as will be described hereinafter.

The sheath 12 is made, for example, of a braided or woven material and has an opening front first end 16 and an open rear second end 18.

Figure 4:
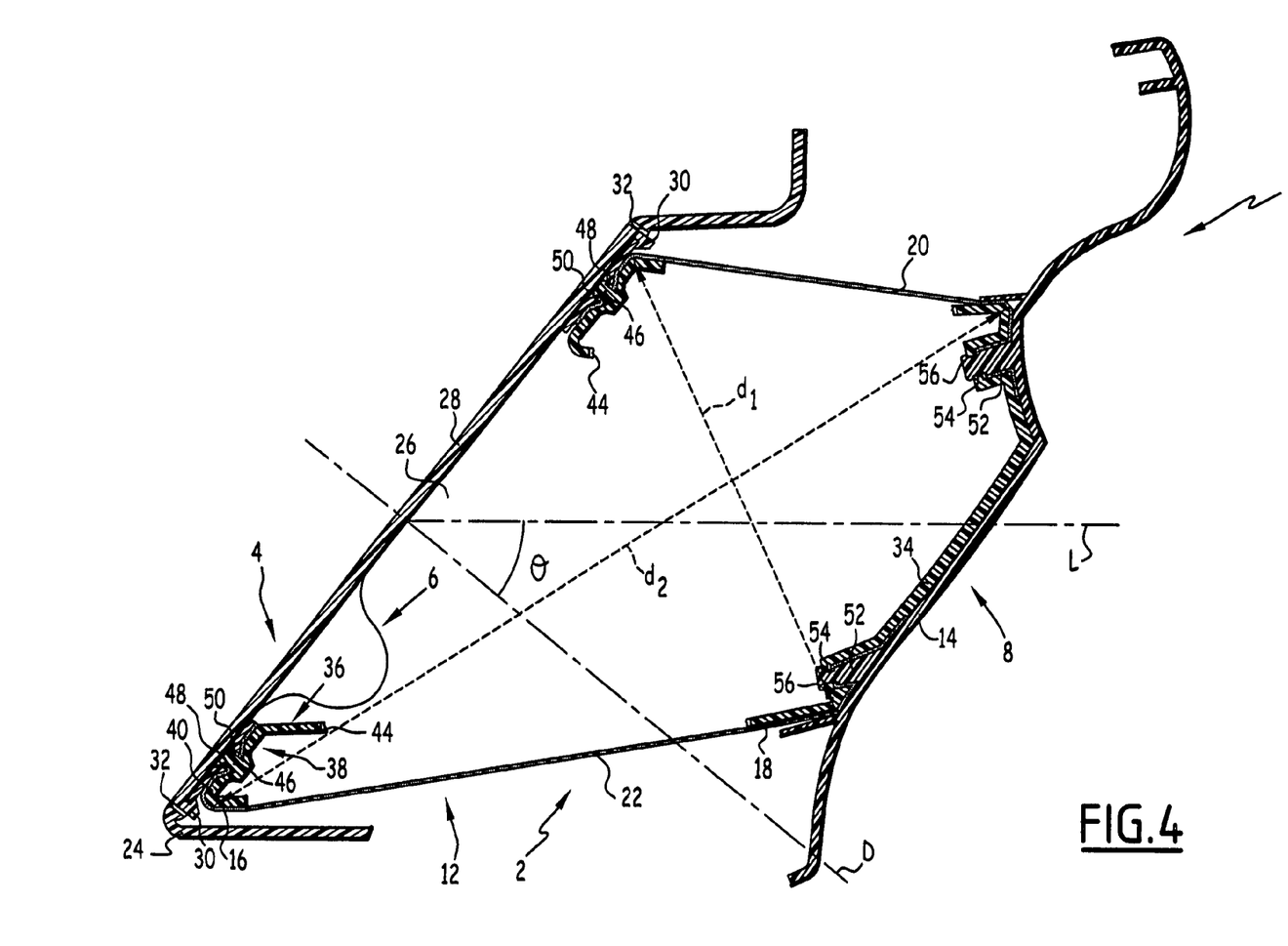

The structure 2 has a folded configuration depicted in FIG. 1 and a deployed configuration depicted in FIG. 4.

In the deployed configuration, the sheath 12 converges from its front end 16 towards its rear end 18.

The sheath 12 is then stretched between its ends 16 and 18 and extends along a median directrix line L that is substantially horizontal in FIG. 4. The sheath 12 has near its front end 16 and about the line L a more or less rectangular outline.

Near the rear end 18 and about the line L the sheath 12 has a similar outline, but of a smaller size.

The upper region 20 of the sheath 12 is appreciably shorter, in the plane of FIG. 4, than the lower region 22 of the sheath 12.

It will be understood that the abovementioned geometric features are specific to the embodiment of FIGS. 1 to 4 and may, in alternative forms, be absent.

The support 4 forms an interior lining for the door 1. The support 4 comprises a peripheral surround 24 internally delimiting an opening 26, and a cover 28 closing the opening 26.

The peripheral surround 24 and the cover 28 are made, for example, of plastics material(s).

The cover 28 is fixed to the surround 24 by the clip-fastening of fingers 30 which extend the cover 28 rearwards and are housed in openings 32 formed in the surround 24.

The cover 28 is arranged in front of the surround 24 and the clip-fastening has been achieved by moving the cover 28 backwards and downwards with respect to the surround 24.

The means 6 for inflating the structure 2 comprise, for example, a gas generator attached to the cover 28.

The generator 6 is of conventional type and its structure will therefore not be described in greater detail hereinafter.

The generator 6 is fixed to the rear face of the cover 28 and therefore faces the load-spreading plate 8.

The load-spreading plate 8 forms, when the structure 2 is in the folded configuration and the door 1 is closed as depicted in FIG. 1, a part of the exterior surface of the instrument panel and may therefore, for example, like it comprise a layer of plastics material covered with a covering skin.

Figure 2:
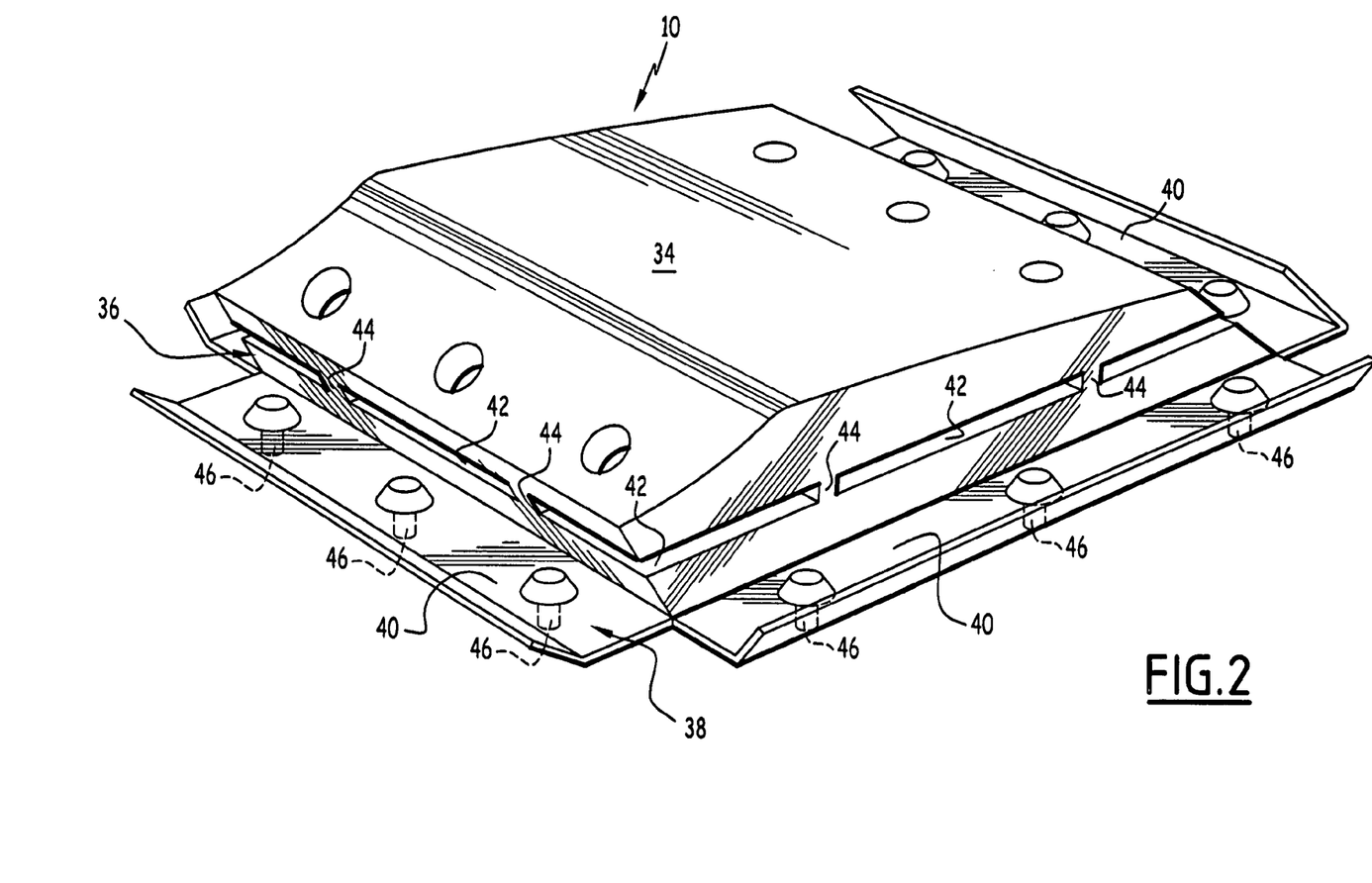

As illustrated more specifically in FIG. 2, the thin fixing web 10 comprises a rear central region 34 with a substantially rectangular outline, an intermediate region 36 which extends the rear central region 34 forwards and a front peripheral region 38 which extends the intermediate region 38 outwards and, for example, comprises four tabs 40, each one arranged on one side of the intermediate region 36.

The intermediate region 36 is a region of lower strength.

In one embodiment, this region of lower strength is obtained by virtue of recesses 42 made in the region 36 and between them delimiting frangible small bridges 44 connecting the central region 34 to the peripheral region 38.

This region of lower strength works in pure tension. This embodiment "with frangible small bridges" offers an advantage over the "V-shaped" weakened lines customarily used in airbag covers because as the cross sections of the frangible small bridges 44 can easily be sized, the rupture load is very repeatable, and less dependent on temperature and on structure inflation conditions.

The thin fixing web 10 has, for example, been produced by moulding a plastic material.

The peripheral region 38 of the thin web 10 is fixed to the surround 24 of the support 4. This fixing is provided in the example depicted by end-pieces 46 which extend the peripheral region 38 forwards and are housed in orifices 48 of the surround 24. The front ends 50 of the end-pieces 46 have been deformed, for example by melting, to form enlarged heads providing a rigid connection between the peripheral region 38 of the thin web 10 and the surround 24 of the support 4. The end-pieces 46 and their heads 50 therefore form rivets clamping the thin web 10 on the support 4.

The front end 16 of the sheath 12 is trapped between the surround 24 and the peripheral region 38 of the thin web 10, thus fixing this front end 16 to the support 4.

It will be noted that the end-pieces 46 therefore pass through orifices made in the front end 16 of the sheath 12 in line with the orifices 48.

Likewise, the central region 34 of the thin web 10 is fixed to the central zone 14 of the load-spreading plate 8 by end-pieces 52 which extend the zone 14 forwards and are housed in orifices 54 of the central region 34 of the thin web 10. The front ends 56 of the end-pieces 52 have been deformed by melting to form enlarged heads. The end-pieces 52 therefore constitute rivets clamping the thin web 10 to the plate 8.

The rear end 18 of the sheath 12 is trapped between the central region 34 of the thin web 10 and the central zone 14 of the plate 8. Thus, the end 18 is fixed to the load-spreading plate 8. Furthermore, the zone 14 of the load-spreading plate 8 covers over the rear end 18 of the sheath 12 and therefore forms the end wall of the structure 2.

To produce the door 1, the sheath 12 is slipped over the thin web 10, and then the central region 34 of the thin web 10 is fixed to the load-spreading plate 8, at the same time fixing the rear end 18 of the sheath 12 to the plate 8. It will be noted that the sheath 12 slipped onto the thin web 10 is then prepositioned. In an alternative form that has not been depicted, the thin web 10 may comprise, in addition to the end-pieces 46, positioning studs intended to be engaged in openings in the sheath 12.

Next, the surround 24 is fixed to the peripheral region 38 of the thin web 10, making it possible simultaneously to fix the front end 16 of the sheath 12 to the surround 24.

Finally, the cover 28, already equipped with the gas generator 6, is fixed on, by clip-fastening onto the surround 24.

If an accelerometer, not depicted, connected to the gas generator 6 detects an impact, this triggers the operation of the generator 6. The gas produced by the generator 6 fills the interior volume of the structure 2 initially in the folded configuration, until the pressure exerted on the central region 34 of the thin web 10 is high enough to break the small bridges 44 of the thin web 10.

Once these small bridges 44 have been broken, the central region 34 of the thin web 10 is separated from its peripheral region 38 and the load-spreading plate 8 can move with respect to the support 4.

Figure 3:
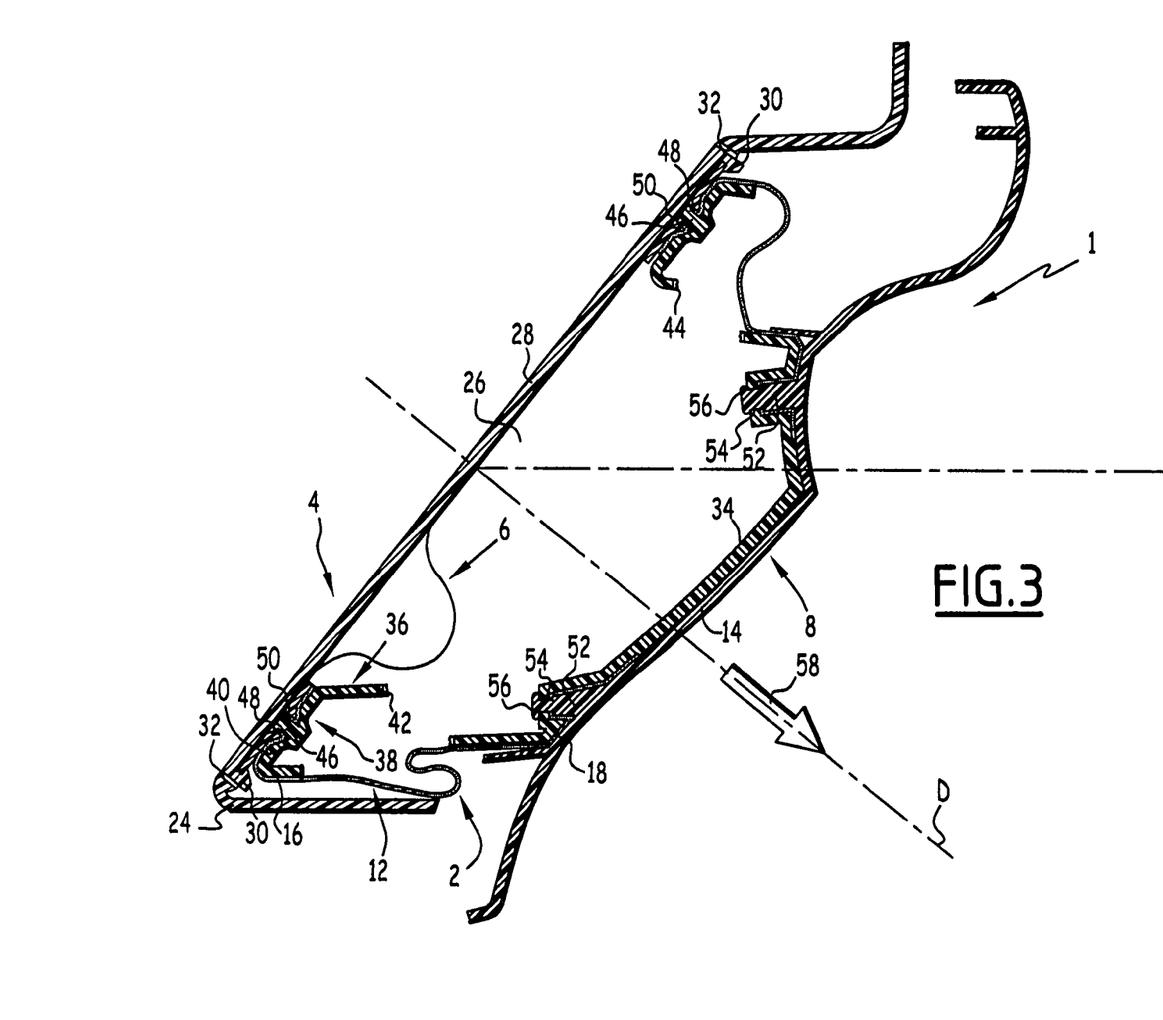

The structure 2 then begins to deploy as illustrated in FIG. 3.

This initial deployment is in a direction of inflation D more or less orthogonal to the cover 28 of the support 4, and therefore inclined downwards and backwards. During this initial phase of the deployment of the structure 2, the load-spreading plate 8 therefore has a tendency to move backwards and downwards, as illustrated by the arrow 58 in FIG. 3.

The diagonal d1 (in dotted line) connecting the upper edge of the front end 16 of the sheath 12 to the lower edge of the rear end 18 of the sheath 12 will become taut before the diagonal d2 (in dotted line) connecting the lower edge of the front end 16 to the upper edge of the rear end.

The side regions of the sheath 12, which connect the upper 20 and lower 22 regions, and which will become taut along the diagonal d1, will therefore cause the load-spreading plate 8 to pivot upwards until the side regions are taut along the diagonal d2.

Thus, in the terminal phase of deployment of the structure 2, the load-spreading plate 8 no longer moves in the direction of inflation D but diverges gradually from this direction to become centred, in the deployed configuration of FIG. 4, on the line L.

The load-spreading plate 8 is therefore at the end of the deployment of the structure situated above the direction of inflation D, properly facing the passenger's knees. The sheath 12 is then taut from its front end 16 to its rear end 18 which means that the directrix line L runs more or less horizontally at an angle θ to the direction of inflation D.

Next, when the passenger's knees strike the load-spreading plate 8, this plate spreads the load applied by the knees over practically its entire area and thus allows the structure 2 to satisfactorily deaden the impact of the passenger's knees with the instrument panel.

The set of equipment 1 described hereinabove has the following advantages.

By virtue of the use of the frangible thin web 10, the load-spreading plate 8 is attached to the support 4 without any take-up of play being needed.

Furthermore, this attachment is reliable which means that any play and outward projection that appear over time are limited. Thus, the vibrations likely to arise over time as the vehicle runs along are limited.

The aesthetic appearance of the set 1 is therefore satisfactory, and this is achieved at low cost.

Furthermore, the thin fixing web 10 is used both for prepositioning and for fixing the sheath 12 and therefore makes it possible to achieve low production costs.

Furthermore, the number of components used is low, making it possible to reduce production costs accordingly. It will also be noted that the moulding of the thin web 10 requires few moving parts in the mould and that the thin web 10 can easily be released from the mould. Its cost of manufacture is therefore low.

Even so, the thin web 10 makes it possible to achieve breakage under a relatively low and well-defined load.

In addition, the thin web 10 forms a member that strengthens the load-spreading plate 8, making it possible to reduce its thickness and therefore the cost of the set 1.

In other alternative forms that have not been depicted, the fixing of the central region 34 and of the peripheral region 38 of the thin web 10 to the load-spreading plate 8 and to the support 4 may be performed using means other than those described.

In particular, use may be made of welding and/or clip fastening techniques.

In another embodiment that has not been depicted, the thin web 10 may be connected by its central region to the support 4 and by its peripheral region to the load-spreading plate 8.

Furthermore, the sheath 12, which is taut in the deployed configuration of the structure 2, itself forms the means of guiding the structure as its deploys, making it possible further to reduce the cost of the set 1.

It will be noted that this feature can be used independently of the use of the frangible thin web 10 and of the embodiment of the structure 2 in the form of a sheath with two open ends.

Thus, the structure 2 may be a conventional structure with an end wall formed integrally with its side wall, which forms the means of guiding the structure as it deploys.

More generally, it will-be noted that these principles may be used to guide the structure 2 along a directrix line L which may be offset laterally and/or vertically with respect to the direction of inflation D so as to achieve the desired end position for the load-spreading plate 8.

In general also, the sheath 12 may, in addition to guiding the structure as already described, alter the orientation of the load-spreading plate 8 with respect to the support 4.

Specifically, in the example described hereinabove, the plate 8 remains more or less parallel to the support 4. However, by altering the lengths of the upper 20, lower 22 and side regions of the side wall of the structure it is possible to modify the orientation of the plate 8 with respect to the support 4.

In a way that is more general yet, auxiliary guide means may be associated with the guide means formed by the side wall of the structure which becomes taut more or less between the front end 16 and the end wall 14 of the structure. These auxiliary guide means may comprise a rim of the instrument panel which will retain the lower edge or upper edge of the load-spreading plate 8 at the start of inflation of the structure.

Figure 5:
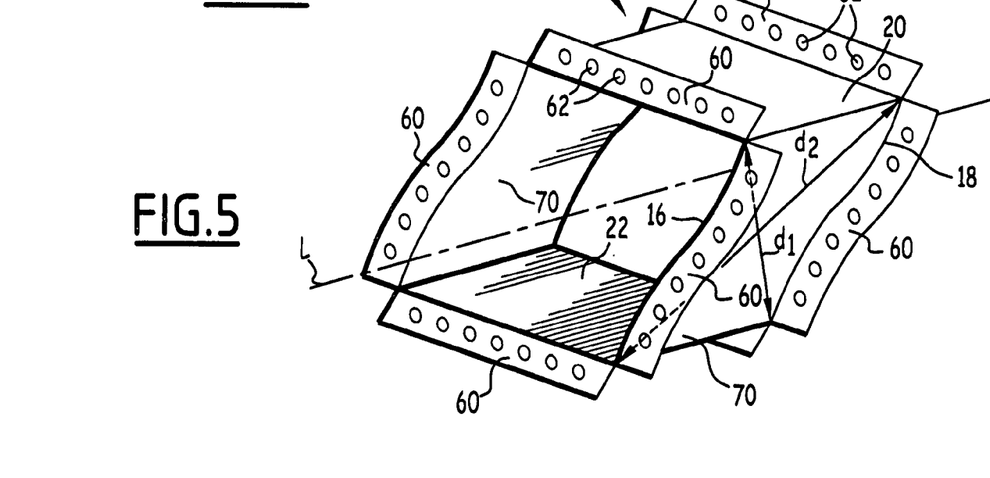
Figure 6:
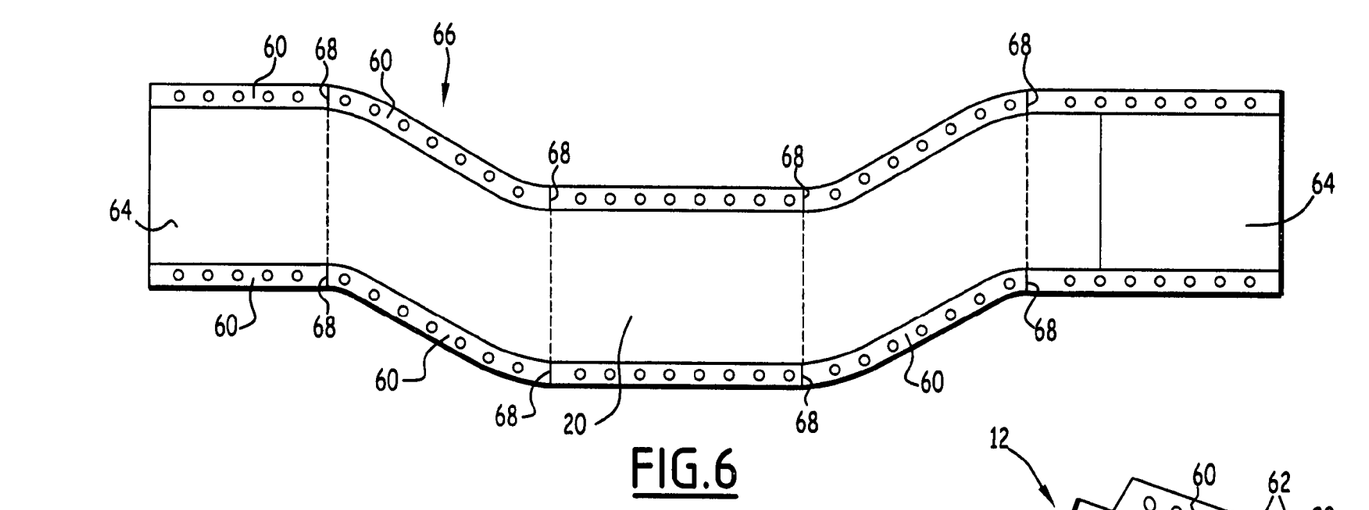

FIGS. 5 and 6 illustrate a sheath 12 according to another embodiment.

As illustrated by FIG. 5 where the sheath is in the deployed configuration, the sheath 12 is essentially of cylindrical shape with a substantially rectangular base and therefore extends more or less, in its main running part, along genetrices parallel to the median directrix line L.

The sheath 12 is equipped at its front end 16 and at its rear end 18 with fixing tabs 60 which extend along the four sides of the rectangular section.

These tabs 60 are equipped with orifices 62 for housing fixings. The tabs 60 are bent outwards to be fixed, at the front end 16, to the support, not depicted, and at the rear end 18 to the load-spreading plate, not depicted.

The sheath 12 may be fixed to the load-spreading plate and to the support by individual and frangible attached members for passing through each orifice 62. Fixing is therefore not necessarily performed by a thin web as it was in the embodiment of FIGS. 1 to 4.

The sheath 12 depicted in the figures has been obtained by joining together the opposite edges 64 of a strip 66 depicted in FIG. 6. This strip 66 runs longitudinally from one edge 64 to the other and has a central offset portion intended to form the upper region 20 of the sheath 12 and thus giving the sheath 12 its desired final shape. Cutouts 68 extend from the longitudinal edges of the strip 66 to delineate the tabs 60.

The edges 64 are, for example, joined together by stitching or by calendering, that is to say by welding using a coating.

Of course, the connection between the edges 64 may be situated at any point on the sheath 12.

It will be noted that the upper 20 and lower 22 regions of the sheath 12 are therefore more or less the same length and that the side regions 70 of the sheath 12 are more or less diamond-shaped so as to produce the rotation effect by tension along the diagonal d1 before tension-along the diagonal d2.

In general, the above principles can be applied to sets of equipment other than sets for protecting the knees and may be intended to protect the driver.

The invention claimed is:

1. Set of equipment for a motor vehicle comprising:
  an inflatable structure comprising a side wall and an end wall, the inflatable structure having a folded configuration and a deployed configuration, a support for the inflatable structure, means for inflating the structure in a direction of inflation (D) in order to deploy the structure, a plate for spreading the load when an occupant of the vehicle impacts on the deployed inflatable structure, and means of guiding the structure as the structure deploys so that, in the deployed configuration, the structure extends along a median directrix line (L) distinct from the direction of inflation (D)

wherein the guide means comprise the side wall of the structure which, in the deployed configuration, is substantially taut, and wherein the set further comprises a sheath forming the side wall of the inflatable structure and comprising an open first end fixed to the support and an open second end fixed to the load-spreading plate, the load-spreading plate closing off the open second end to form the end wall of the inflatable structure.

2. Set of equipment according to claim 1, wherein the side wall of the structure has a first diagonal (d1) shorter than a second diagonal (d2) of the side wall so that, as the structure deploys, the side wall which is substantially taut along the first diagonal (d1) brings the structure towards the median directrix line (L).

3. Set of equipment according to claim 1, wherein, when the structure is in the deployed configuration, the side wall extends substantially over its entire periphery along generatrices parallel to the median directrix line (L).

4. Set of equipment according to claim 1, wherein the median directrix line (L) is intended to be inclined upwards with respect to the direction of inflation (D) when the set of equipment is installed in a motor vehicle.

5. Set of equipment according to claim 1, the set constituting an element for protecting the knees of an occupant of the motor vehicle.

6. Motor vehicle comprising a set of equipment according to claim 1.

* * * * *